United States Patent
Her et al.

(10) Patent No.: US 6,702,954 B1
(45) Date of Patent: Mar. 9, 2004

(54) CHEMICAL-MECHANICAL POLISHING SLURRY AND METHOD

(75) Inventors: Yie-Shein Her, Canandaigua, NY (US); Ramanathan Srinivasan, San Jose, CA (US); Suryadevara Babu, Potsdam, NY (US); Suresh Ramarajan, Boise, ID (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/692,730

(22) Filed: Oct. 19, 2000

(51) Int. Cl.$^7$ ............................................. C09K 13/00
(52) U.S. Cl. ..................... 252/79.1; 252/79.2; 252/79.3
(58) Field of Search ................................. 438/690, 691, 438/692, 693; 252/79.1, 79.2, 79.3; 251/51, 41

(56) References Cited

U.S. PATENT DOCUMENTS

| | | | |
|---|---|---|---|
| 4,789,648 A | 12/1988 | Chow et al. ................. | 437/225 |
| 5,738,800 A | 4/1998 | Hosali et al. ................ | 216/99 |
| 5,759,917 A | 6/1998 | Grover et al. ............... | 438/690 |
| 6,136,711 A | * 10/2000 | Grumbine et al. .......... | 438/692 |
| 6,194,317 B1 | * 2/2001 | Kaisaki et al. .............. | 438/692 |

FOREIGN PATENT DOCUMENTS

| | | |
|---|---|---|
| EP | 0786504 A2 | 7/1997 |
| EP | 0846740 A1 | 6/1998 |
| EP | 0853335 A3 | 1/1999 |
| WO | 9953532 | 10/1999 |

* cited by examiner

Primary Examiner—Nadine G. Norton
Assistant Examiner—Lan Vinh
(74) Attorney, Agent, or Firm—Rankin, Hill, Porter & Clark LLP

(57) ABSTRACT

The present invention provides a chemical-mechanical polishing slurry for use in removing a barrier layer during the fabrication of a damascene structure. The slurry according to the invention includes an agent that suppresses the rate at which an underlying silicon-containing dielectric layer is removed. In the presently most preferred embodiment of the invention, the agent that suppresses the rate at which an underlying silicon-containing dielectric layer is removed is L-lysine and/or L-arginine. The present invention also provides a method of suppressing the removal rate of an underlying silicon-containing dielectric layer during the chemical-mechanical polishing of a barrier layer in a damascene structure. The method according to the invention includes polishing the barrier layer with a slurry comprising an agent that suppresses the rate at which said underlying silicon-containing dielectric layer is removed.

17 Claims, No Drawings

CHEMICAL-MECHANICAL POLISHING SLURRY AND METHOD

FIELD OF INVENTION

The present invention provides a chemical-mechanical polishing slurry for use in removing a barrier layer during the fabrication of a damascene structure, and a method of suppressing the removal rate of an underlying silicon-containing dielectric layer during the chemical-mechanical polishing of a barrier layer in a damascene structure using the slurry.

BACKGROUND OF THE INVENTION

Integrated circuits are made up of millions of active devices formed in or on a substrate such as silicon or gallium arsenide. The active devices are typically isolated from each other using silicon-containing dielectric materials such as polysilicon, single-crystalline silicon, silicon dioxide, silicon-containing low-k inorganic and organic materials, phosphosilicate glass, borophosphosilicate glass, and the like. The active devices are usually formed in multiple layers that are interconnected to form functional circuits and components. Interconnection of active devices is typically accomplished through the use of well-known multilevel interconnection processes such as the process disclosed in Chow et al., U.S. Pat. No. 4,789,648.

Copper, aluminum and tungsten are preferred metals used to fabricate integrated circuits. These metals, however, have a tendency to diffuse into conventional silicon-containing dielectric materials. Once silicon-containing dielectric materials have been contaminated with metal atoms, the dielectric constant is adversely affected and the integrated circuit may cease to function properly. Therefore, a barrier layer or liner film must be applied to the silicon-containing dielectric layer in order to prevent metal diffusion.

One of the presently preferred methods of fabricating integrated circuits having metal wiring and interconnects, which are also known as damascene structures, generally comprises providing interconnected metal wiring or metallization patterns in a discrete layer of silicon-containing dielectric film. The silicon-containing dielectric layer is etched or otherwise processed to pattern a series of trenches and holes therein. A thin barrier layer, generally not more than approximately 300 Å (30 nm) thick, is then deposited over the silicon-containing dielectric layer. When the metal used to form the wiring pattern is copper, the preferred barrier layer comprises a thin film of tantalum and/or tantalum nitride. When the metal used to form the wiring pattern is aluminum or tungsten, the preferred barrier layer comprises a thin film of titanium and/or titanium nitride. Such barrier layers are commonly deposited by physical vapor deposition, which is also known as sputter deposition, or they may be deposited by chemical vapor deposition. The barrier layer coats the surfaces of the trenches and holes as well as the upper surface of the silicon-containing dielectric layer to prevent metal diffusion and also to provide good adhesion between the metallization layer and the silicon-containing dielectric layer. A layer of metal approximately 3,000–15,000 Å (300–1,500 nm) thick is then deposited over the barrier layer so as to completely fill the trenches and holes. The filled trenches thus form a network of metal lines whereas the filled holes form vias or interconnects. The final step in the process of fabricating an integrated circuit, which is also known as a damascene process, is removing the metal layer and barrier layer down to the upper surface of the silicon-containing dielectric layer leaving only the metal filled trenches and holes. This is typically accomplished by chemical-mechanical polishing.

In a typical chemical-mechanical polishing process, the surface of the damascene structure is placed in direct contact with a rotating polishing pad at a controlled downward pressure. An abrasive and chemically reactive solution commonly referred to as a "slurry" is present between the pad and the surface of the damascene structure during polishing. The slurry initiates the polishing process by chemically reacting with the surface of the metal and/or barrier layer being polished. The polishing process is facilitated by the rotational movement of the pad relative to the substrate and the presence of the slurry at the film/pad interface. Polishing is continued in this manner until the desired metal and barrier layer are removed.

The composition of the slurry is an important factor in the chemical-mechanical polishing. If the chemical agents and abrasives in the slurry are selected properly, the slurry can be tailored to provide effective polishing of metals and barrier layers at desired polishing rates while minimizing surface imperfections, defects and corrosion and erosion. Furthermore, the polishing slurry can preferably provide controlled polishing selectivities to other materials used to construct the damascene structure.

One of the problems with known chemical-mechanical polishing slurries used to remove barrier layers in damascene structures is that they tend to remove the underlying silicon-containing dielectric layers at a relatively high rate. This makes it very difficult to remove all of the barrier layer without eroding or otherwise damaging the underlying silicon-containing dielectric layer. Because of this problem, in many instances the polishing of the barrier layer is stopped too soon, which results in a portion of the barrier layer remaining on the damascene structure. Conversely, if polishing of the barrier layer is stopped too late, the result is that significant portions of the underlying silicon-containing dielectric layer are removed. In either circumstance, the integrity and functionality of the integrated circuit can be adversely affected.

A need exists for a chemical-mechanical polishing slurry for use in removing barrier layers from damascene structures that reduces and/or eliminates this problem. Such a chemical-mechanical polishing slurry would preferably remove barrier layers at a high enough rate to insure acceptable throughput while at the same time avoid removing or damaging the underlying silicon-containing dielectric layers.

SUMMARY OF INVENTION

The present invention provides a chemical-mechanical polishing slurry for use in removing a barrier layer during the fabrication of a damascene structure. The slurry according to the invention comprises an agent that suppresses the rate at which an underlying silicon-containing dielectric layer is removed. In the presently most preferred embodiment of the invention, the agent that suppresses the rate at which an underlying silicon-containing dielectric layer is removed is lysine and/or arginine.

The present invention also provides a method of suppressing the removal rate of an underlying silicon-containing dielectric layer during the chemical-mechanical polishing of a barrier layer in a damascene structure. The method according to the invention includes incorporating in a chemical-mechanical polishing slurry an agent that suppresses the rate at which the underlying silicon-containing dielectric layer is removed.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a chemical-mechanical polishing slurry for use in removing a barrier layer during the fabrication of a damascene structure. The slurry according to the invention comprises an agent that suppresses the rate at which an underlying silicon-containing dielectric layer is removed. An agent is considered to suppress the rate at which an underlying silicon-containing dielectric layer is removed within the meaning of such terms as used in the instant specification and in the appended claims if: (1) the agent, when present in a chemical-mechanical polishing slurry, reduces the rate at which an underlying silicon-containing dielectric layer is removed by 50% or more as compared to when the agent is not present in the slurry; and (2) the agent, when present in a chemical-mechanical polishing slurry, does not reduce the rate at which the barrier layer is removed to an unacceptable level as compared to when the agent is not present in the slurry.

Preferably, the agent that suppresses the rate at which an underlying silicon-containing dielectric layer is removed comprises a compound having at least two functional amino groups ($NH_2$) and at least one functional carboxylic acid group (COOH). In the presently most preferred embodiment of the invention, the agent that suppresses the rate at which said underlying silicon-containing dielectric layer is removed is selected from the group consisting of lysine and arginine. As used throughout the specification and in the appended claims, reference to lysine and arginine is intended to refer to both the D- and L-forms of the compounds, as well as the salts and hydrated forms of such compounds. Furthermore, as used throughout the specification and in the appended claims, reference to lysine and arginine is intended to refer to precursors and derivatives of such compounds.

An effective amount of the amount of the agent that suppresses the rate at which an underlying silicon-containing dielectric layer is removed should be used to obtain the desired erosion suppression effect. Typically, the agent comprises from about 0.1% to about 5.0% by weight of the slurry. In a preferred embodiment of the invention, the agent comprises about 1.0% by weight of the slurry.

Optionally, the slurry according to the present invention can further comprise abrasive particles. However, it will be appreciated that for some applications it may be preferable for the slurry not to contain abrasive particles. In such circumstances, the mechanical polishing action is provided by the pressure of the polishing pad. When present, abrasive particles further assist in performing the function of mechanical grinding.

Abrasive particles that may be used in the slurry according to the present invention may comprise any one or a mixture of a variety of abrasive particles that are conventionally utilized in chemical-mechanical polishing slurries. Examples of suitable abrasive particles include alumina, ceria, copper oxide, diamond, iron oxide, nickel oxide, manganese oxide, silica, silicon carbide, silicon nitride, tin oxide, titania, titanium carbide, tungsten oxide, yttria, and zirconia, and combinations thereof. The presently most preferred abrasive for use in the invention are alumina and/or silica.

The abrasive particles preferably have a mean size ranging from about 0.02 to about 1.0 micrometer, with a maximum size of less than about 10 micrometers. It will be appreciated that while particle size is not per se critical, the use of very small abrasive particles can result in an unacceptably low polishing rate in some instances. It will also be appreciated that if, on the other hand, the particles are too large, then unacceptable scratching can occur on the surface of the article being polished. The abrasive particles can be present in the slurry in an amount up to about 60% by weight of the slurry, more preferably from about 0.25% to about 30.0% by weight of the slurry, and optimally within the range of from about 0.5% to about 10.0% by weight of the slurry.

In some circumstances, it is advantageous for the slurry to further comprise an oxidizing agent. Suitable oxidizing agents for use in the invention include, for example, peroxides, persulfates, peroxydiphosphates, ferric nitrate, periodic acid, and periodates. Presently, the most preferred oxidizing agents for use in the slurry according to the invention are hydrogen peroxide, ammonium persulfate, and/or potassium sulfate. The oxidizing agent preferably comprises up to about 15.0% by weight of the slurry. More preferably, the oxidizing agent comprises from about 0.1% to about 10.0% by weight of the slurry.

The slurry according to the invention also preferably comprises a solvent. The preferred solvent for use in the invention is deionized water. Other solvents conventionally used in chemical-mechanical polishing slurries can also be used. In addition, the slurry may also contain optional surfactants, pH buffers, anti-foaming agents, and dispersing agents, which are well known to those skilled in the art.

When the barrier layer to be removed comprises tantalum/tantalum nitride, it is preferable for the pH of the slurry to be adjusted to about 7.0 or higher, with a pH of about 10.0 being most preferred. The pH of the slurry can be raised using a base such as KOH. When the barrier layer to be removed comprises titanium/titanium nitride, it is preferable for the pH of the slurry to be adjusted to about 7.0 or less, with a pH of about 4.0 being most preferred. The pH of the slurry can be lowered using an acid such as $HNO_3$. Erosion of silicon-containing dielectric layers is most severe at higher pH.

Preferably, the slurry according to the present invention is prepared by dispersing the agent that suppresses the rate at which said underlying silicon-containing dielectric layer is removed in a conventional solvent such as, for example, deionized water. If abrasive particles are to be included in the slurry, the slurry can be prepared in a number of ways. For example, the slurry may be prepared by dispersing the abrasive particles in a solvent either before or after the oxidizing agent and/or agent that suppresses the rate at which said underlying silicon-containing dielectric layer is removed has been added. The slurry may also be prepared as a two-component system (i.e., an abrasive dispersed in deionized water component and an oxidizing agent and agent that suppresses the rate at which said underlying silicon-containing dielectric layer is removed in deionized water component). The slurry may also be prepared in concentrated form needing only the addition of deionized water to dilute the concentrate (or concentrated components in a two-component system) to the desired level.

Alternatively, the slurry according to the present invention may be formed by incorporating a portion of the components of the slurry in a polishing pad. For example, the agent that suppresses the rate at which said underlying silicon-containing dielectric oxide layer is removed could be incorporated directly in the polishing pad, either with or without abrasive particles, and deionized water and an oxidizing agent could then be added to the pad or the surface of the article being polished to form the polishing slurry in situ. In another alternative embodiment, the abrasive particles could be bonded to the polishing pad, and the agent that suppresses the rate at which said underlying silicon-containing dielectric layer is removed and deionized water could be added either separately or together to the pad or the surface of the article being polished to form the polishing slurry in situ. It will be appreciated that the components of the slurry according to the invention could be combined in various ways to form the slurry in situ.

It is also possible to form the components of the slurry by combining chemical precursors together either before or at the time of polishing. Thus, as used in the specification and in the appended claims, the term "slurry" should be understood to refer to the components present at the interface between the polishing pad and the surface of the article being polished during chemical-mechanical polishing, and, unless otherwise stated, use of the term "slurry" is intended to encompass situations where precursors are combined to form the components of the slurry in situ.

The present invention is also directed to a method of suppressing the removal rate of an underlying silicon-containing dielectric layer during the chemical-mechanical polishing of a barrier layer in a damascene structure. The method comprises incorporating an agent that suppresses the rate at which said underlying silicon-containing dielectric layer is removed in a chemical-mechanical polishing slurry. The preferred agents that suppress the rate at which said underlying silicon-containing dielectric layer is removed are lysine and/or arginine.

The following examples are intended only to illustrate the invention and should not be construed as imposing limitations upon the claims.

EXAMPLE I

Slurries A, B, C, D, E, F, G, H, and I were formed by dispersing 4.0% by weight ceria having an average particle diameter of 350 nm in deionized water. Various amounts of several different amino acids were added to eight of the slurries as noted in Table I below. The pH of each slurry was adjusted to 10.0, unless otherwise noted in Table I, by adding KOH.

Blanket silicon wafers (6" diameter) having a 1.0 micron silicon dioxide film layer applied by tetraethylorthosilicate (TEOS) precursor chemical vapor deposition were separately polished with each of the nine slurries described above using a Strasbaugh 6CA polisher and a Rodel IC1400 K-grooved pad. The polishing conditions were: 6 psi down pressure; 0 psi back pressure; 40 rpm table speed; 40 rpm quill speed; 22° C. temperature; and 340 cc/min slurry flow rate. The amount of silicon dioxide removed from the surface of the silicon wafer by chemical-mechanical polishing was measured using an optical interferometer to determine the rate of removal in terms of nm of silicon dioxide removed per minute. The results of the testing are shown in Table I below.

TABLE I

| Slurry | pH | Agent (wt %) | TEOS Polishing Rate |
| --- | --- | --- | --- |
| A | 10.0 | NONE | 489 ± 9 nm/min |
| B | 10.0 | 1.0% glycine | 547 ± 30 nm/min |
| C | 10.0 | 4.0% glycine | 420 ± 30 nm/min |
| D | 10.0 | 8.0% glycine | 410 ± 10 nm/min |
| E | 9.5 | 4.0% glycine | 417 ± 32 nm/min |
| F | 10.0 | 4.0% proline | 536 ± 10 nm/min |
| G | 10.0 | 1.0% proline | 487 ± 19 nm/min |
| H | 10.8 | 1.0% arginine | 23 ± 3 nm/min |
| I | 10.0 | 1.0% lysine | 71 ± 3 nm/min |

Example I demonstrates that the presence of arginine and/or lysine in a chemical-mechanical polishing slurry has the effect of suppressing the rate of silicon-containing dielectric removal.

EXAMPLE II

Slurries J and K were formed by dispersing 5.0% by weight alumina having an average particle diameter of 150 nm in deionized water, with 1.0% by weight ascorbic acid and 1.0% by weight hydrogen peroxide: Slurry J also included 1.0% by weight L-arginine. The pH of each slurry was adjusted to 10.0 by adding a sufficient amount of KOH.

Blanket silicon wafers (6" in diameter) that were previously coated with a 1.0 micron thick film layer of either vapor deposited tetraethylorthosilicate (TEOS), copper, tantalum, or tantalum nitride, were then polished with slurries J and K described above using a Strasbaugh 6EC polisher and an IC1000/Suba IV k-grooved stacked pad. The polishing conditions were: 4 psi down pressure; 1 psi back pressure; 40 rpm table speed; 40 rpm quill speed; 20° C. temperature; and 300 cc/min slurry flow rate. The amount of each film layer removed from the surface of the silicon wafers by chemical-mechanical polishing was measured using an optical interferometer to determine the rate of removal in terms of Å removed per minute. The results of the testing are shown in Table II below.

TABLE II

| Slurry | Cu Removal Rate | Ta Removal Rate | TaN Removal Rate | TEOS Removal Rate |
| --- | --- | --- | --- | --- |
| J | 3180 Å/min | 165 Å/min | 179 Å/min | 0 Å/min |
| K | 4199 Å/min | 535 Å/min | 463 Å/min | 35 Å/min |

Example II demonstrates that the presence of arginine in a chemical-mechanical polishing slurry substantially suppresses the rate at which a silicon-containing dielectric layer is removed during chemical-mechanical polishing, and that the presence of arginine in the slurry does not suppress the rate at which barrier films are removed to an unacceptably low level.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A chemical-mechanical polishing slurry for use in removing a barrier layer during the fabrication of a damascene structure comprising an amount of an agent selected from the group consisting of lysine and arginine sufficient to suppress the rate at which an underlying silicon-containing dielectric layer is removed by at least about 50% as compared to the rate at which said underlying silicon-containing dielectric layer would be removed if said agent was not present in said slurry.

2. The chemical-mechanical polishing slurry according to claim 1 wherein said agent that suppresses the rate at which said underlying silicon-containing dielectric layer is removed comprises by weight from about 0.1% to about 5.0% of said slurry.

3. The slurry according to claim 1 wherein said underlying silicon-containing dielectric layer is selected from the group consisting of polysilicon, single-crystalline silicon, silicon dioxide, silicon-containing low-k inorganic and organic materials, phosphosilicate glass, and borophosphosilicate glass.

4. The chemical-mechanical polishing slurry according to claim 1 wherein said barrier layer comprises tantalum and/or tantalum nitride.

5. The chemical-mechanical polishing slurry according to claim 4 wherein the pH of said slurry is about 7.0 or higher.

6. The chemical-mechanical polishing slurry according to claim 1 wherein said barrier layer comprises titanium and/or titanium nitride.

7. The chemical-mechanical polishing slurry according to claim 6 wherein the pH of said slurry is about 7.0 or lower.

8. The chemical-mechanical polishing slurry according to claim 1 further comprising abrasive particles.

9. The chemical-mechanical polishing slurry according to claim 8 wherein said abrasive particles are selected from the group consisting of alumina, ceria, copper oxide, diamond, iron oxide, nickel oxide, manganese oxide, silica, silicon carbide, silicon nitride, tin oxide, titania, titanium carbide, tungsten oxide, yttria, and zirconia.

10. The chemical-mechanical polishing slurry according to claim 1 further comprising an oxidizing agent.

11. The chemical-mechanical polishing slurry according to claim 10 wherein said oxidizing agent is selected from the group consisting of peroxides, persulfates, peroxydiphosphates, ferric nitrate, periodic acid, and periodates.

12. The chemical-mechanical polishing slurry according to claim 1 further comprising a solvent.

13. The chemical-mechanical polishing slurry according to claim 12 wherein said solvent comprises deionized water.

14. A chemical-mechanical polishing slurry for use in removing a tantalum and/or tantalum nitride or titanitum and/or titanium nitride barrier layer during the fabrication of a damascene structure, said slurry comprising an amount of an agent selected from the group consisting of lysine and arginine sufficient to suppress the rate at which an underlying silicon-containing dielectric layer is removed by at least about 50% as compared to the rate at which said underlying silicon-containing dielectric layer would be removed if said agent was not present in said slurry.

15. The chemical-mechanical polishing slurry according to claim 14 wherein said agent that suppresses the rate at which an underlying silicon-containing dielectric layer is removed comprises from about 0.1% to about 5.0% by weight of said slurry.

16. The chemical-mechanical polishing slurry according to claim 14 further comprising:

abrasive particles;

an oxidizing agent; and a solvent.

17. The chemical-mechanical polishing slurry according to claim 16 wherein said oxidizing agent is selected from the group consisting of peroxides, persulfates, peroxydiphosphates, ferric nitrate, periodic acid, and periodates.

\* \* \* \* \*